United States Patent Office 2,957,807
Patented Oct. 25, 1960

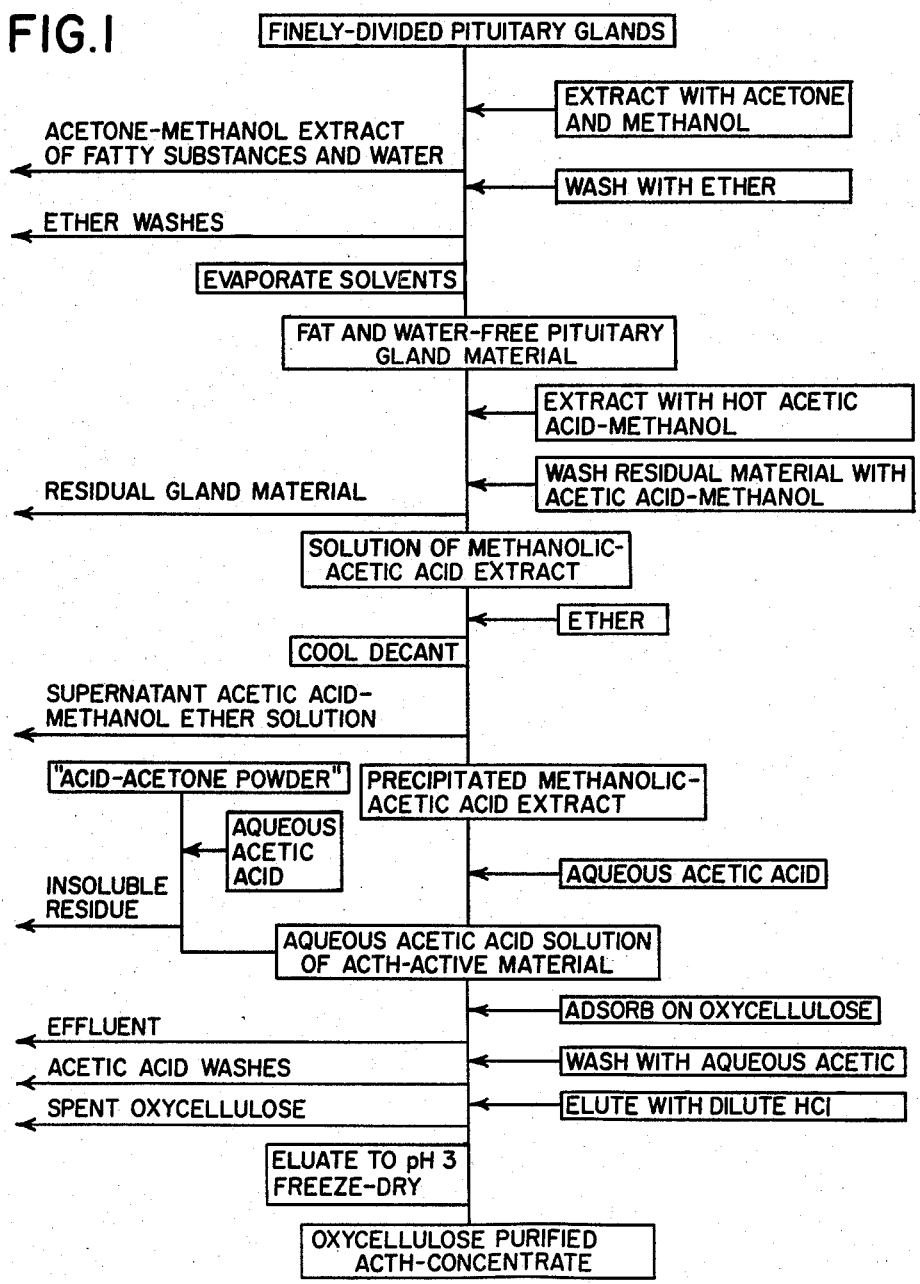

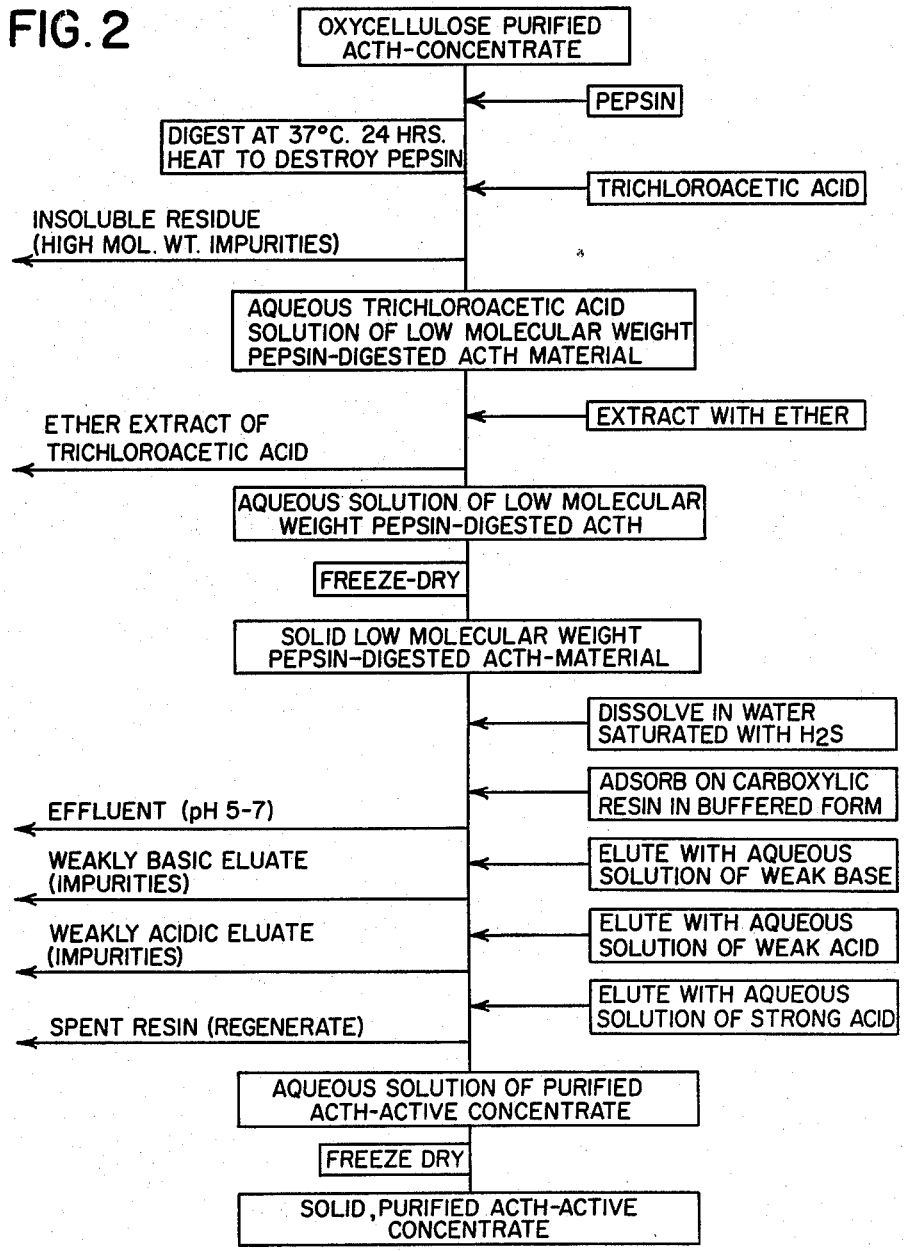

2,957,807
PROCESS OF PREPARING ACTH-ACTIVE CONCENTRATES

John W. Richter, Wilmington, Del., Donald E. Ayer, Boston, Mass., and Norman G. Brink, Westfield, N.J., assignors to Merck & Co., Inc., Rahway, N.J., a corporation of New Jersey Filed Oct. 31, 1957, Ser. No. 693,586

5 Claims. (Cl. 167—74)

This invention is concerned generally with novel compositions having the activity of the adrenocorticotropic hormone, and with processes for preparing these compositions. More particularly, it relates to a novel polypeptide composition having the highest adrenocorticotropic hormonal activity yet reported for any substance, and with a novel method of preparing this composition starting with pituitary glands or extracts thereof.

This application is a continuation-in-part of copending application Serial No. 278,952, filed March 27, 1952, now abandoned.

Various extracts and concentrates of pituitary glands possessing adrenocorticotropic hormonal activity (hereinafter referred to as ACTH activity) have been prepared heretofore, but these prior art products have ordinarily been very impure and have consisted largely of substances having little or no ACTH activity. Moreover, prior art extracts of pituitary glands (which apparently owned their ACTH activity to corticotropin, the naturally-occurring ACTH-active principle present in pituitary glands), are relatively inactive, even when highly purified in view of the fact that corticotropin does not itself possess as high ACTH activity as our polypeptide composition.

We have now discovered that a polypeptide composition possessing extremely high ACTH activity can be prepared by contacting crude digests of pituitary gland extracts, in solution, with a cation-exchange resin deriving its exchange capacity essentially from carboxylic groups, whereby highly ACTH-active substances are selectively adsorbed on the resin, from which they are, in turn, selectively eluted by means of an aqueous mineral acid solution. The polypeptide composition thus obtained has been found, when tested by the assay method of Sayers et al. as modified by Munson et al. (Endocrinology 42, 379 (1948)), to possess approximately three hundred times the ACTH activity of Armour Standard La–1–A. The last-named material is a standardized corticotropin product made by Armour & Co. and is used hereinbelow as a standard for evaluating the ACTH activity of the various extracts and concentrates obtained in the course of the preparation of our novel polypeptide composition.

Our novel polypeptide composition, which is ordinarily prepared in the form of its acid addition salt, is a white amorphous solid containing less than 1% sulfur and negligible ash. This polypeptide composition, in the form of the hydrochloric acid addition salt, is soluble in water and methanol, is slightly soluble in dry ethanol, and is insoluble in dry acetone, ether, chloroform and benzene. The infrared absorption spectrum of the hydrochloric acid addition salt of this polypeptide composition discloses only amide linkages; in the range 2300–4000 A., the absorption spectrum of this salt in aqueous solution exhibits a single maximum at about 2750–2780 A., $E_{1\,cm.}^{1\%}$ about 18 to 20

This polypeptide composition gives at most a very slight, almost negative ninhydrin color when a small spot is formed on Whatman No. 1 filter paper from a solution of 60 micrograms of the polypeptide composition in 10 microliters of water, following which the paper is sprayed with 0.1% ninhydrin in n-butanol, and the paper dried at 80° C. for a period of five minutes.

When this polypeptide composition, in the form of its trichloroacetic acid addition salt, is analyzed by means of the Craig counter-current distribution procedure (Craig, chap. IV, "Technique of Organic Chemistry," vol. III (Interscience Publishers, Inc., New York, 1950), p. 171 ff.), utilizing the system s-butyl alcohol-0.5% aqueous trichloroacetic acid, the composition has been found to consist of at least three individual components. The trichloroacetic acid addition salt of one of these components (which has been named corticotropin-B and which possesses extremely high ACTH activity) has a distribution coefficient of about 0.6 in the two-phase system s-butyl alcohol-0.5% aqueous trichloroacetic acid.

Our novel polypeptide composition is very susceptible to loss of activity in solutions in contact with air or other oxidizing agent. This inactivation, which is apparently due to oxidation of the polypeptide molecules to products having lower ACTH activity, can be substantially reversed by reacting the inactivated material with a mild reducing agent such as hydrogen sulfide, cysteine, thioglycollic acid, sodium sulfite, and the like. The ACTH activity of this polypeptide composition is irreversibly destroyed by hydrolysis (in contrast to the reversible inactivation of this substance by mild oxidizing agents). For example, the ACTH activity is substantially completely and permanently lost by heating the polypeptide composition in solution in 0.3 N aqueous hydrochloric acid for a period of one hour at 100° C. When our polypeptide composition is hydrolyzed according to the method of Stein and Moore (J. Biol. Chem. 176, 337, 344 (1948)), employing a quantity of 6 N aqueous hydrochloric acid equal to 200 times the weight of the polypeptide composition, with the sole change that the hydrolysis is carried out under nitrogen, and the hydrolysis product analyzed for amino acid content in accordance with the procedure of Moore and Stein (J. Biol. Chem. 192, 663 (1951)), the hydrolyzate is found to contain the thirteen amino acids: glycine, alanine, valine, proline, serine, phenylalanine, tyrosine, methionine, aspartic acid, glutamic acid, histidine, lysine and arginine. Cystine, threonine, leucine and isoleucine are absent from the hydrolysate. The results of hydrolysis of the polypeptide composition, and of the separation and analysis of the hydrolysis products, according to the foregoing procedures are as follows:

| Amino Acid | Nitrogen Content<br>Percent of Total Nitrogen in Hydrolysate (Average of Determinations Made on Hydrolysates of two Different Preparations of the Polypeptide Composition) |
|---|---|
| Glycine | 6.9 |
| Alanine | 2.5 |
| Valine | 6.1 |
| Leucine | None |
| Isoleucine | None |
| Proline | 6.6 |
| Serine | 3.1 |
| Threonine | None |
| Phenylalanine | 2.5 |
| Tyrosine | 4.7 |
| Crystine | None |
| Methionine | 1.7 |
| Aspartic Acid | 4.8 |
| Glutamic Acid | 6.1 |
| Histidine | 6.3 |
| Lysine | 16.4 |
| Arginine | 28.7 |
| Ammonia | 3.6 |
| Total | 100.0 |

We prepare our novel polypeptide composition by a resin adsorption and elution procedure as set forth hereinabove utilizing, as starting material, a crude digest of a pituitary gland extract. In preparing this starting material, we can utilize pituitary gland material, as for example, hog pituitary glands, beef pituitary glands, sheep pituitary glands, and the like, or if desired, we can employ ACTH-active extracts of pituitary glands and concentrates thereof which are available commercially. When pituitary gland material is used, the pituitary gland material can be treated in accordance with the hydrochloric acid-acetone extraction procedure of Li et al. (J. Biol. Chem. 149, 413 (1943)) to produce a corticotropin concentrate to which Li has given the name "acid-acetone powder"; a commercial corticotropin concentrate comparable with this "acid-acetone powder" is distributed by Armour & Co. under the name "Acthar A." Instead of employing the Li et al. procedure, we ordinarily prefer to extract finely-divided pituitary gland material with acetone, thereby removing fatty substances and water present in the pituitary gland substances, and then to extract the residual product with a methanolic solution of acetic acid. Addition of ether to the methanol extract results in the precipitation of an ACTH-active concentrate which is referred to hereinbelow as the "methanolic-acetic acid extract."

The pituitary gland extract (which ordinarily has about three to five times the ACTH activity of Armour Standard La–1–A) is contacted in solution with oxycellulose whereby the ACTH-active substances are selectively adsorbed on the oxycellulose, from which they are eluted using an aqueous mineral acid solution as the eluting agent. The adsorption operation is carried out by dissolving the pituitary gland extract in a weakly-acidic aqueous solution, for example an aqueous acetic acid solution, such as an 0.1 N aqueous acetic acid solution, and contacting the resulting solution with the oxycellulose. We ordinarily use a pre-washed oxycellulose prepared by washing commercial oxycellulose containing about 10–12% free carboxyl, first with an aqueous solution of hydrochloric acid and then an aqueous solution of acetic acid. The oxycellulose selectively adsorbs ACTH-active material from the solution, and the resulting oxycellulose-adsorbate is then contacted with a dilute aqueous mineral acid solution, preferably 0.1 N aqueous hydrochloric acid, whereby the ACTH-active substances are eluted from the oxycellulose. The resulting eluate is adjusted to a pH of approximately 2.5–3 which is conveniently accomplished by treating the eluate with a strongly basic anion exchange resin in its carbonate form. The resin is removed by filtration, and the filtrate is evaporated to give an ACTH-active concentrate which ordinarily has about 60–85 times the ACTH activity of Armour Standard La–1–A.

The ACTH-active concentrate from the oxycellulose adsorption and elution is then digested with pepsin under relatively mild conditions. This pepsin digestion is ordinarily conducted in an aqueous acidic solution (pH about 2–3) at a temperature within the range of about 35–40° C. for a period of about one day. The digested solution is heated to destroy the pepsin, and the resulting solution cooled and treated with trichloroacetic acid, thereby precipitating high molecular weight substances of low ACTH activity. The clarified aqueous solution is extracted with a water-immiscible, organic solvent such as ether, thereby removing excess trichloroacetic acid, and the aqueous solution is evaporated from the frozen state in vacuo to give a pepsin-digested product. This "pepsin-digested material," which we ordinarily utilize as starting material in our novel resin adsorption and elution procedure, has approximately 80 times the activity of Armour Standard La–1–A, and contains our polypeptide composition admixed with other polypeptides of lower ACTH activity as well as materials of lower basicity having little or no ACTH activity.

In conducting our novel resin adsorption and elution procedure "pepsin-digested material," prepared as described hereinabove or, if desired, obtained by pepsin-digestion of a crude pituitary extract which has not been subjected to treatment with oxycellulose, is contacted with a cation-exchange resin deriving its exchange capacity essentially from carboxylic groups, whereby the ACTH-active substances present in the pepsin digest, and in particular our polypeptide composition, are selectively adsorbed on the resin, from which said ACTH-active substances are, in turn, selectively eluted by means of an aqueous mineral acid solution. Cation-exchange resins having carboxylic polar groups have heretofore been described in the literature. In general, they are formed either by condensing a phenol and an aldehyde, one of which contains a carboxyl group, particularly resorcylic acid and formaldehyde, or by the copolymerization of a polymerizable acid with a divinyl compound, i.e. a compound having two $CH_2=CH-$ groups, such for example, as acrylic or methacrylic acid and divinyl benzene. Resins of this type are described in United States Patents No. 2,319,359; No. 2,333,754; No. 2,340,110; No. 2,340,111, and others, and are characterized by the common quality of having their cation-exchange ability dependent upon carboxyl groups in the resin molecule. In the practice of the present invention, we prefer to use a copolymer of acrylic or methacrylic acid and divinyl benzene wherein the divinyl benzene component constitutes from 2.5 to 5% of the resin composition (e.g. Amberlite IRC–50, a commercially available resin manufactured by Rohm & Haas Co.), since such resins have a remarkable selective adsorption action for the ACTH-active substances in "pepsin-digested material." Although the resin can be utilized in its hydrogen form, it is ordinarily preferred to place the resin in the buffered form. This "buffered form" is prepared by pre-treating the resin, prior to the adsorption operation, with an aqueous solution of an alkali metal hydroxide such as sodium hydroxide, potassium hydroxide and the like, thereby converting the resin in part to the alkali metal resinate. The ratio of hydrogen to salt form is preferably balanced so that the spent feed solution has a pH of about 5–7.

The adsorption operation is carried out by dissolving the "pepsin-digested material" in water, preferably containing a mild reducing agent such as hydrogen sulfide, sodium sulfite, thioglycollic acid, cysteine, and the like, and passing the resulting solution through a column of the carboxylic-type cation-exchange resin (which is preferably in the buffered form) at a rate sufficiently slow so that the resin adsorbs substantially all of the ACTH-active material present in the solution. When the column has been buffered properly the effluent pH is about 5–7. At higher pH values, the polypeptide composition is more susceptible to inactivation; at lower pH values, adsorption may not be complete, since solutions of low pH are, in fact, capable of eluting the polypeptide composition from the resin.

Following the adsorption step, the resin-adsorbate is washed with water, with a mildly alkaline aqueous solution, and with a weakly acidic aqueous solution, thereby removing materials which are of lower basicity than our polypeptide composition and which possess little or no ACTH activity. Surprisingly enough, the weak acid and weak base washings elute materials having substantially no ACTH activity, while removing practically none of the ACTH-active substances adsorbed on the resin. For the weakly basic solution, we ordinarily utilize an aqueous solution containing a tertiary heterocyclic amine such as pyridine, picoline, the lutidines, collidines and the like; we prefer to employ aqueous pyridine. In addition to the basic washing, we ordinarily wash the resin-adsorbate with an aqueous solution of a lower alkanoic acid, such as acetic acid, propionic acid, formic acid, and the like, preferably an aqueous solution of acetic acid. In order to minimize losses of ACTH-active material due to inactivation, we ordinarily incorporate in each of the solutions used to wash the resin adsorbate, a mild reducing agent, characterized as being capable of reducing organic disulfides to the corresponding sulfhydryl compounds, such as hydrogen sulfide, sodium sulfite, sodium thiosulfite, thioglycollic acid, cysteine, and the like.

The resin-adsorbate is first eluted with an aqueous mineral acid solution such as aqueous hydrochloric acid, aqueous sulfuric acid, aqueous phosphoric acid, and the like, having a pH greater than about 1.8 (corresponding to a normality of about 0.015 N) whereby substances, having lower basicity than our polypeptide composition and lower ACTH activity, are eluted from the resin-adsorbate. The resin-adsorbate is then eluted with an aqueous mineral acid solution, for example aqueous hydrohalic acid, aqueous sulfuric acid, aqueous phosphoric acid, preferably an aqueous solution of hydrochloric acid, having a pH within the range of about 1.0 and 1.8 (0.1 N to 0.015 N) whereby our ACTH-active polypeptide composition is eluted from the resin-adsorbate. We ordinarily prefer to utilize an aqueous mineral acid solution having a pH within the range of 1.5 to 1.6 (0.032 N to 0.025 N) as the eluting agent for eluting the polypeptide composition from the resin-adsorbate. The latter eluate is then evaporated from the frozen state in vacuo to give our novel polypeptide composition which has approximately 300 times the ACTH activity of Armour Standard La-1-A, and which can be further characterized as set forth in columns 2-3, lines 38-72, hereinabove.

The polypeptide composition is ordinarily produced in the form of the acid addition salts, as it is less stable in the form of the free base. The free base may be prepared, however, by dissolving an acid addition salt, such as the hydrochloric acid salt, in methanol and adding an organic base such as triethylamine to the methanolic solution, whereupon the polypeptide composition precipitates as the free base. Various acid addition salts may be prepared from the free base and from each other by known methods, such as reaction with acids, metathesis, and ion-exchange procedures.

Flow sheets outlining the hereinabove described process are set forth in the drawing Figures 1 and 2.

The following examples illustrate methods of carrying out the present invention, but it is to be understood that these examples are given for purposes of illustration and not of limitation.

*Example 1*

Forty grams of a corticotropin concentrate ("acid-acetone powder") derived from the hog pituitary glands by the hydrochloric acid-acetone extraction procedure described by Li et al., J. Biol. Chem. 149, 413 (1943) and having an ACTH activity of four times that of Armour Standard La-1-A, were added to 1200 ml. of an 0.1 N aqueous solution of acetic acid. The resulting mixture was stirred for a period of several hours, and was then filtered to remove a small quantity of insoluble material. To this filtered solution was added 40 g. of washed oxycellulose (prepared by washing commercial oxycellulose, containing about 10-12% free carboxyl, first with a 1 N aqueous solution of hydrochloric acid and then with an 0.1 N aqueous solution of acetic acid), and the mixture was stirred at about room temperature for a period of about twenty-four hours, whereby ACTH-active material was adsorbed on the oxycellulose. The oxycellulose-adsorbate was recovered by filtration and washed with several 200 ml.-portions of an 0.1 N aqueous solution of acetic acid.

The oxycellulose-adsorbate was added to 200 ml. of an 0.1 N aqueous solution of hydrochloric acid and the mixture was stirred for a period of about one-half hour. The mixture was filtered, the oxycellulose was added to a fresh 200 ml.-portion of 0.1 N aqueous hydrochloric acid solution; the resulting mixture was stirred for a period of about one-half hour and the oxycellulose was again removed by filtration. The filtered solutions (eluates) were combined, and the combined solution was adjusted to a pH of 2.5-3 by the addition of a strongly-basic anion exchange resin in its carbonate form. The resin was removed by filtration, and the filtrate was evaporated from the frozen state in vacuo to give 1.5 g. of an amorphous white powder which, upon being assayed utilizing the assay method of Sayers et al. as modified by Munson, Endocrinology 42, 379 (1949), was found to be about 75 times as active as Armour Standard La-1-A.

Six and four-tenths grams of this amorphous white powder (prepared utilizing the procedure described hereinabove and having ACTH activity about 75 times La-1-A) was dissolved in 320 ml. of water, and to this solution was added 23.7 mg. of pepsin. The pH of the solution was adjusted to about 2.5 by the addition of several drops of dilute aqueous hydrochloric acid solution, and the acidic solution was maintained at a temperature of about 37° C. for a period of about twenty-four hours. The resulting solution was then heated to about 90° C. and maintained at this temperature for a period of about fifteen minutes to destroy the pepsin. The solution was then cooled to room temperature, 36 ml. of a 50% aqueous solution of trichloroacetic acid was added to the cooled solution, and the resulting mixture was allowed to stand for a period of about one hour. The precipitated material (high molecular-weight substances of low ACTH activity) was removed by centrifugation and discarded. The clarified solution (volume approximately 350 ml.) was then extracted with six 350 ml.-portions of ether thereby extracting excess trichloroacetic acid from the aqueous solution. The aqueous solution, following this extraction operation, was warmed under reduced pressure thereby distilling the residual ether therefrom, and the resulting solution was evaporated from the frozen state in vacuo to give 5.6 g. of an amorphous white powder. This pepsin-digested material was found by assay to possess about 80 times the ACTH activity of Armour Standard La-1-A.

Three hundred milligrams of this pepsin-digested material (having ACTH activity 80 times La-1-A) was dissolved in 10 ml. of water substantially saturated with hydrogen sulfide. This solution was passed downwardly through a resin column prepared as follows:

Twenty-five grams of granular Amberlite IRC-50 (a cation exchange resin which derives its exchange capacity predominantly from carboxyl groupings and which is manufactured by the Rohm and Haas Co.), 20-60 mesh, in its hydrogen form, was stirred with 200 ml. of water, and an aqueous solution containing 0.5 g. of sodium hydroxide was added slowly to the aqueous mixture; when the sodium ion had been adsorbed on the resin, the resin was washed with water to give a resin material which has approximately 15% in the sodium form, the remainder being in the hydrogen form; this resin material was placed in a 50 ml. burette, and the resin column was filled with water substantially saturated with hydrogen sulfide.

The rate of the solution downward through the resin column was such that a period of about one and one-half hours was required for passage of the solution through the column, during which time the resin adsorbed substantially all of the ACTH-active material originally present in the solution. The resin column was then washed with 50 ml. of water substantially saturated with hydrogen sulfide downwardly at a rate of about 1 ml. per minute. Over a period of about three hours, the resin column was washed, first with 250 ml. of a 10% aqueous pyridine solution containing about 125 mg. of sodium sulfite, and then with 500 ml. of a 10% aqueous acetic acid solution substantially saturated with hydrogen sulfide, thereby removing materials of lower basicity than corticotropin-B and having little or no ACTH activity.

Two hundred milliliters of an aqueous solution of hydrochloric acid having a pH of 2 and substantially saturated with hydrogen sulfide was passed downwardly through the resin column at a rate of about 100 ml. per hour, followed, at the same rate, by 200 ml. of an aqueous solution of hydrochloric acid having a pH of 1.58, likewise substantially saturated with hydrogen sulfide. Two corresponding eluate fractions were collected, each was separately adjusted to pH 2.5–3 by the addition of the strongly basic anion exchange resin, Amberlite IRA–400, in the carbonate form, and each of the eluates was individually filtered and evaporated from the frozen state in vacuo. The first fraction gave 60 mg. of polypeptide composition, both products being hydrochloric acid addition salts obtained in the form of amorphous white powders. Each of these products were assayed utilizing the method of Sayers et al. referred to hereinabove and each was found to possess about 300 times the ACTH activity of Armour Standard La–1–A.

*Example 2*

Five hundred grams of fresh frozen hog whole pituitary glands were mixed with 1000 ml. of acetone and the mixture was homogenized in a blender. The resulting mixture was then stirred with 2 liters of acetone for a period of about three hours, and the supernatant liquid was decanted and discarded. The residual material was washed with two 2000 cc.-portions of acetone and with one 2000 cc.-portion of methanol, thereby removing substantially all of the fatty substances and water present in the pituitary gland starting material; these acetone and methanol washings were likewise discarded. The residual gland material was recovered by filtration, washed with ether and air-dried to give 100 g. of solid product which, upon being assayed by the method of Sayers et al. referred to hereinabove, was found to possess approximately one-half the activity of Armour Standard La–1–A.

The latter product was then mixed with 900 ml. of methanol in a vessel equipped with an agitator, reflux condenser and a drying tube, and the resulting mixture was stirred until well dispersed. Six hundred milliliters of glacial acetic acid was then added, and the mixture was stirred and heated at reflux temperature, approximately 75° C., for a period of about two hours. The mixture was allowed to settle while cooling to room temperature, and the precipitated solid material was recovered by filtration and washed with 300 ml. of a 40% solution of acetic acid in methanol. This methanol washing was added to the filtered solution, and to the resulting solution (volume approximately 1500 ml.) was added about 1500 ml. of ether. The resulting solution was allowed to stand for a period of about fifteen hours at a temperature of 0–5° C. and the precipitate which formed was recovered by filtration, washed with ether until free of acetic acid, and dried in vacuo, at room temperature over potassium hydroxide to give 13 g. of methanolic-acetic acid extract which was found by assay to have about three times the ACTH activity of Armour Standard La–1–A.

The methanolic-acetic acid extract was then processed utilizing the same procedure used to treat the "acid-acetone powder" as set forth in the first three paragraphs of Example 1 as follows: The methanolic-acetic acid extract was dissolved in an 0.1 N aqueous solution of acetic acid, and the resulting solution was contacted with oxycellulose whereby ACTH-active substances were adsorbed on the oxycellulose; the ACTH-active substances were eluted from the resulting adsorbate by means of aqueous hydrochloric acid, the eluates were evaporated from the frozen state in vacuo, and the amorphous white powder thus obtained was digested with pepsin in aqueous solution at 37° C.; the resulting solution was heated at 90° C. to destroy the pepsin and trichloroacetic acid was added to the resulting solution thereby precipitating impurities; after removal of the precipitate and extraction of the excess trichloroacetic acid with ether, the resulting aqueous solution was evaporated from the frozen state in vacuo to give an amorphous powder which, upon assay, was found to possess about 10 times the ACTH activity of Armour Standard La–1–A.

One and six-tenths grams of the pepsin-digested material (ACTH activity approximately 100 times the activity of Armour La–1–A), prepared as described above was dissolved in 25 ml. of water substantially saturated with hydrogen sulfide. This solution was passed downwardly, at a rate of 8 milliliters per hour through a resin column, 80 centimeters high by 2 centimeters in diameter (the resin having been prepared using Armberlite IRC–50 resin in accordance with the procedure described in Example 1 hereinabove), whereby the resin adsorbed substantially all of the ACTH-active materials present in said solution. The column was then washed, first with 150 ml. of water substantially saturated with hydrogen sulfide, at a rate of about 30 ml. per hour, then with 1000 ml. of a 10% aqueous solution of pyridine containing about 0.5 g. of sodium sulfite, and finally with 2500 ml. of a 10% aqueous acetic acid solution substantially saturated with hydrogen sulfide, thereby removing materials of lower basicity than corticotropin–B and having little or no ACTH activity.

Four hundred milliliters of an aqueous solution of hydrochloric acid having a pH of 2 and substantially saturated with hydrogen sulfide was passed downwardly through the resin column at a rate of about 200 ml. per hour, followed by 1000 ml. of an aqueous solution of hydrochloric acid having a pH of 1.58, likewise substantially saturated with hydrogen sulfide at the same rate. Two corresponding eluate fractions were collected, each was separately adjusted to pH 2.5–3 by the addition of a strongly basic anion exchange resin in its carbonate form, and each of the eluates was individually filtered and evaporated from the frozen state in vacuo. The evaporation of the eluate corresponding to the eluant of pH 2 gave about 200 mg. of polypeptide composition having an ACTH activity by assay of about 150 times that possessed by Armour Standard La–1–A. The evaporation of the eluate corresponding to eluant of pH 1.58 gave about 300 mg. of polypeptide composition, said product being obtained as an amorphous white powder in the form of the hydrochloric acid salt. This polypeptide was found by assay to possess about 300 times the ACTH activity of Armour Standard La–1–A.

*Example 3*

An ACTH concentrate was prepared from beef pituitary gland utilizing substantially the same procedure described for the treatment of hog pituitary gland in the first two paragraphs of Example 2 hereinabove. The "methanolic-acetic acid extract" of beef pituitary gland thus obtained was then subjected to pepsin digestion followed by trichloroacetic acid precipitation utilizing substantially the same procedure described in the third paragraph of Example 1. Two hundred milligrams of this pepsin-digested ACTH-active concentrate (ACTH activity by assay approximately twice that possessed by Armour Standard La–1–A) was dissolved in 80 ml. of water and the resulting solution was passed, at a rate of 0.8 ml. per minute through a resin column, 50 centimeters long by 1.5 centimeters in diameter (the resin having been prepared from Amberlite IRC–50 in accordance with the procedure described in Example 1 hereinabove, said resin being about 15% in the sodium salt form and the remainder being in the hydrogen form), thereby adsorbing substantially all of the ACTH-active materials present in the solution on the resin. The resin-adsorbate was then washed with 25 ml. of water, followed by 200 ml. of a 10% aqueous solution of acetic acid at a rate of 4 ml. per minute, thereby removing impurities less basic than corticotropin–B from the resin column.

One hundred milliliters of an 0.15 N aqueous solution of hydrochloric acid (pH approximately 0.8) was then passed through the column at a rate of 1.2 ml. per minute, thereby eluting ACTH-active material from the resin adsorbate. This hydrochloric acid eluate was then evaporated from the frozen state in vacuo, the residual material was dissolved in methanol, ether was added to the methanol solution and the precipitate which formed was recovered by centrifugation and dried at room temperature in vacuo to give 50 mg. of an ACTH concentrate having an ACTH activity about 5 times that possessed by Armour Standard La–1–A.

*Example 4*

A corticotropin concentrate ("acid-acetone powder"), derived from hog pituitary glands by the hydrochloric-acetone extraction procedure described by Li et al. (J. Biol. Chem. 149, 413 (1943)) was subjected directly to pepsin digestion followed by trichloroacetic acid precipitation impurities in accordance with the procedure described in the third paragraph of Example 1. The pepsin digested material thus prepared was found by assay to possess about 3 times the ACTH activity of Armour Standard La–1–A.

Five and five-tenths grams of this pepsin-digested material was dissolved in 700 ml. of water, and the solution was passed, at a rate of 5 ml. per minute, through two resin columns connected in series, each of which was five feet long by 1.8 centimeters in diameter; the resin in the first column was prepared by treatment of 150 g. of Amberlite IRC–50 with an aqueous solution of sodium hydroxide containing a total of 3 g. of NaOH whereby the resin was converted in part to the sodium salt form; the second column contained 150 g. of Amberlite IRC–50 which was entirely in the hydrogen form. During the passage of the solution of pepsin-digested material through the columns, substantially all of the ACTH-active materials present in the solution were adsorbed on the resin. The resin in the columns was washed successively with 400 ml. of water followed by 1000 ml. of a 10% aqueous solution of acetic acid at a rate of 10 ml. per minute, thereby removing impurities less basic than corticotropin-B from the resin columns.

The washed resin-adsorbate in the columns was then eluted with fourteen separate portions of aqueous hydrochloric acid solution. The first four elutions were carried out using 0.015 N HCl (pH=1.8); fractions 5 to 9 were conducted using 0.028 N HCl (pH=1.55); and fractions 10 to 14 were conducted using 0.10 N HCl (pH=1.0). The volume of each of the eluate fractions was 200 ml. with the exception of fraction 4 in which 400 ml. was employed. The individual eluates were collected separately, individually lyophilized (freeze-dried), and the solid product thus obtained was, in each case, dissolved in methanol and precipitated from the methanol solution by the addition of ether. The various fractions were then assayed for ACTH activity; fraction 5, weight 236 mg., was found to have less than six times the ACTH activity of Armour Standard La–1–A; each of fractions 7, 8 and 9, which weighed respectively 185 mg., 180 mg. and 139.8 mg., were found to possess between 18 and 23 times the ACTH activity possessed by La–1–A; fractions 10, 13 and 14, weights 81.5 mg., 119.8 mg. and 110 mg. respectively, were found to possess ACTH activity within the range of seven to ten times that of La–1–A.

Seven hundred and thirty milligrams of pepsin-digested material, which had been subjected to resin adsorption and elution as described hereinabove, and which was selected from fractions assaying approximately twenty times the ACTH activity of Armour Standard La–1–A, were dissolved in 125 ml. of water, and the solution was passed, at a rate of 0.8 ml. per minute, through a resin column, six feet long by two centimeters in diameter (the resin in the column prepared from Amberlite IRC–50 in accordance with the procedure described in Example 1 hereinabove, said resin being about 15% in the sodium salt form and the remainder being in the hydrogen form), thereby adsorbing substantially all of the ACTH-active materials present in the solution on the resin. The resin-adsorbate was then washed successively with 200 ml. of water at a rate of 3 ml. per minute, with 1 liter of a 10% aqueous solution of pyridine at a rate of 10 ml. per minute, and with 2 liters of a 10% aqueous solution of acetic acid at a rate of 10 ml. per minute, thereby removing impurities less basic than corticotropin-B from the column.

Five hundred milliliters of an 0.015 N aqueous solution of hydrochloric acid (pH approximately 1.8) was then passed through the column at a rate of 12 ml. per minute; 1500 ml. of an 0.028 N aqueous solution of hydrochloric acid was then passed through the column at a rate of 3 ml. per minute. Two corresponding eluate fractions were collected, each of the eluates was individually frozen and dried from the frozen state in vacuo, and the residual products thus obtained were individually dissolved in methanol and precipitated therefrom by the addition of ether. The precipitates were separately recovered by filtration and dried at room temperature in vacuo. The precipitate corresponding to the 0.015 N HCl eluate contained material of low ACTH activity. From the 0.028 N HCl eluate was obtained 81 mg. of ACTH-active material which was about 80 times as active as Armour Standard La–1–A.

Various changes and modifications may be made in carrying out the present invention without departing from the spirit and scope thereof. Insofar as these changes and modifications are within the purview of the annexed claims, they are to be considered as part of our invention.

We claim:

1. The process which comprises bringing a solution of an ACTH-active pepsin digest of a pituitary extract containing corticotropin-B into contact with a resin formed by the copolymerization of an acrylic acid and divinyl benzene deriving its exchange capacity predominantly from carboxylic groups, a minor proportion of said resin being in the salt form, thereby selectively adsorbing ACTH-active substances on said resin, contacting the resulting resin-adsorbate with an aqueous solution of a non-oxidizing mineral acid selected from the group consisting of hydrohalic, sulfuric and phosphoric acids thereby selectively eluting ACTH-active substances from the resin, and evaporating the resulting eluate to produce a polypeptide composition having enhanced ACTH activity.

2. The process which comprises bringing into intimate contact (1) an aqueous solution containing an ACTH-active pepsin-digested material containing corticotropin-B obtained by adsorbing ACTH-active materials from a pituitary gland extract with oxycellulose, eluting the oxycellulose adsorbate with an aqueous solution of hydrochloric acid and subjecting the resulting eluate to the action of pepsin at a temperature of about 35–40° C. for a period of about one day in an aqueous acidic solution, and (2) a cation-exchange resin, buffered at a pH within the range 5 to 7, formed by the copolymerization of an acrylic acid and divinyl benzene and characterized as deriving its exchange capacity predominantly from carboxylic groups and being approximately 15% in the sodium form, thereby selectively adsorbing ACTH-active substances present in said pepsin-digested material on said resin, washing the resulting resin-adsorbate with an aqueous pyridine solution, with an aqueous solution of acetic acid and with an aqueous solution of hydrochloric acid having a pH greater than about 2 thereby eluting substantially inactive materials of low basicity from said resin, eluting the washed resin-adsorbate with an aqueous solution of hydrochloric acid having a pH within the range 1.5–1.6, thereby eluting ACTH-active material from said resin, and evaporating the latter eluate to produce a polypeptide composition having approximately three hundred times the ACTH activity of the standardized corticotropin preparation, Armour Standard La–1–A.

3. In the process of producing a polypeptide composition having enhanced ACTH activity from an ACTH-active pepsin digest of a pituitary extract containing corticotropin-B, the step which comprises bringing an aqueous solution of said digest into contact with a resin formed by the copolymerization of an acrylic acid and divinyl benzene and characterized as deriving its exchange capacity predominantly from carboxylic groups, said resin being buffered to a pH of about 5 to 7, thereby selectively adsorbing ACTH-active substances present in said digest on said resin.

4. In the process of producing a polypeptide composition having enhanced ACTH activity from an ACTH-active pepsin digest of a pituitary extract containing corticotropin-B, the step which comprises bringing an aqueous solution of said digest into contact with a resin formed by the copolymerization of an acrylic acid and divinyl benzene and characterized as deriving its exchange capacity predominantly from carboxylic groups, said resin being approximately 15% in the salt form and approximately 85% in the hydrogen form, thereby selectively adsorbing ACTH-active substances present in said digest on said resin.

5. In the process of producing a polypeptide composition having enhanced ACTH activity from an ACTH-active pepsin digest of a pituitary extract containing corticotropin-B, the step which comprises washing a resin adsorbate, comprising a carboxylic cation-exchange resin formed by the copolymerization of an acrylic acid and divinyl benzene having adsorbed thereon corticotropin-B and ACTH-inactive constituents of said digest having a lower basicity than corticotropin-B, with an aqueous solution having a pH greater than 2 thereby selectively eluting ACTH-inactive constituents from said resin adsorbate, and contacting the washed resin-adsorbate with an aqueous solution having a pH within the range 1.0–1.8 thereby eluting corticotropin-B from said resin.

References Cited in the file of this patent

Lesh: Science, vol. 112, July 1950, pp. 43–45.
Payne: J. Biol. Chem., vol. 187, No. 2, December 1950, p. 726.
Astwood: J.A.C.S., June 1951, pp. 2969–2970.
Dixon: Nature, vol. 168, December 15, 1951, pp. 1044–1045.
Ralli: Adrenal Cortex, 1951, p. 30.